Dec. 11, 1956  A. U. ESLICK  2,773,526
SCREW DISPENSING AND AFFIXING MECHANISM
Filed May 26, 1955  4 Sheets-Sheet 1

INVENTOR.
ARTHUR U. ESLICK
BY
Hauke & Hardesty
ATTORNEYS

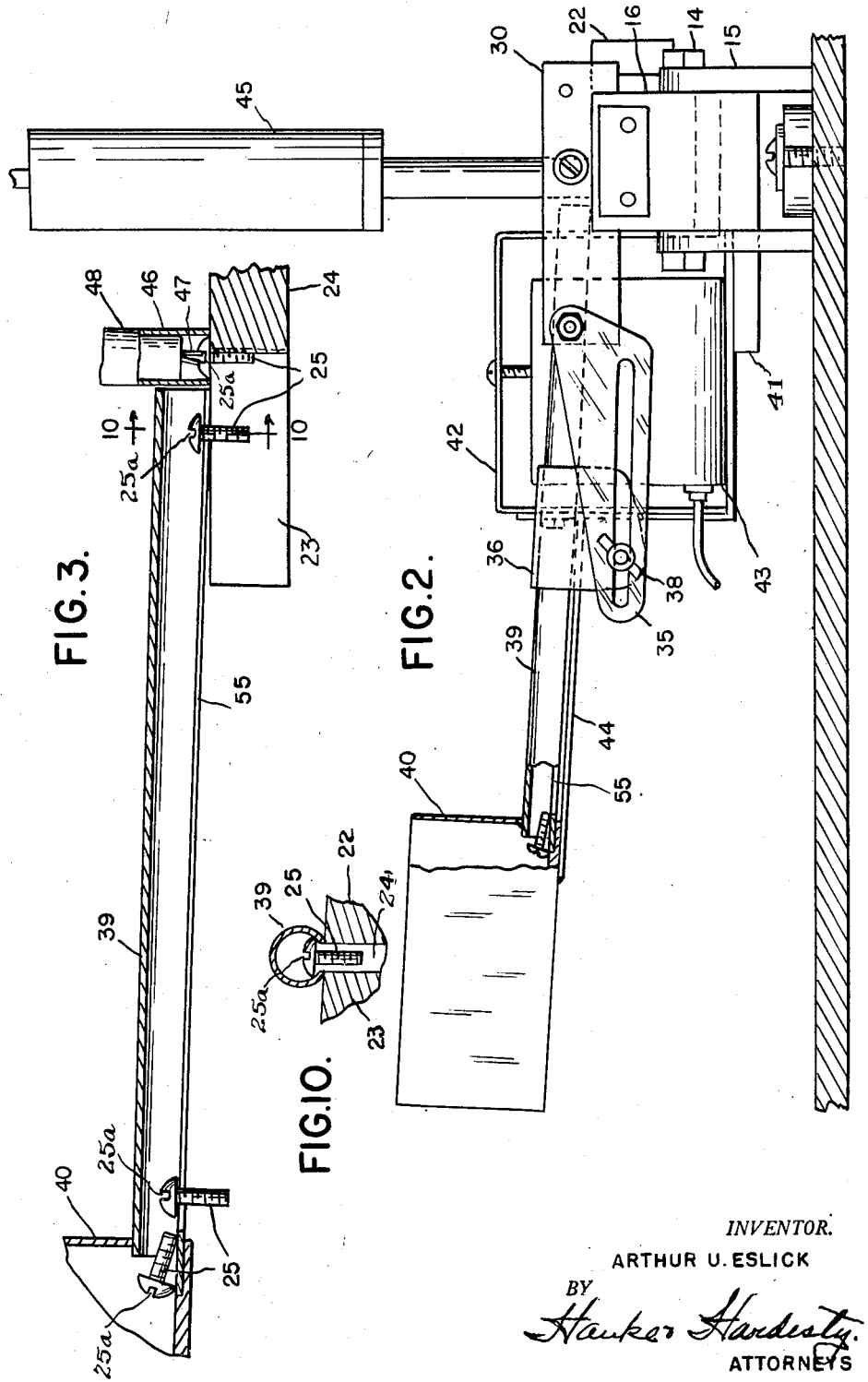

Dec. 11, 1956         A. U. ESLICK        2,773,526
SCREW DISPENSING AND AFFIXING MECHANISM
Filed May 26, 1955        4 Sheets-Sheet 3

*INVENTOR:*
ARTHUR U. ESLICK
BY
*Hauke & Hardesty*
ATTORNEYS

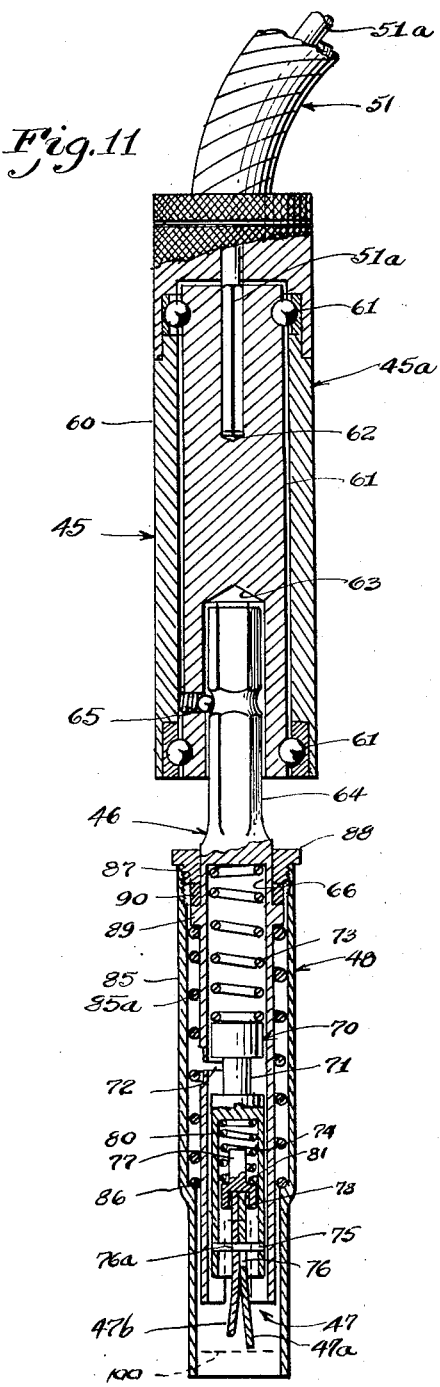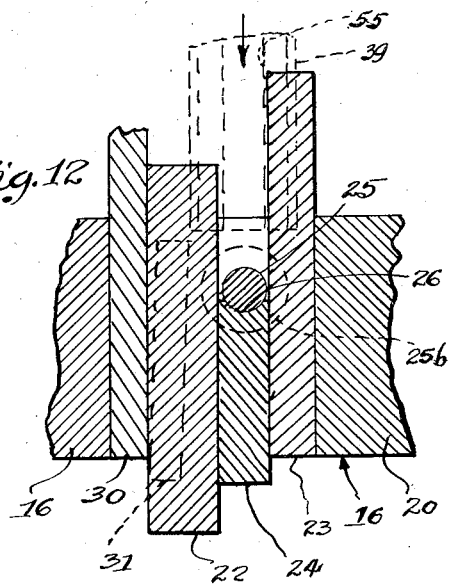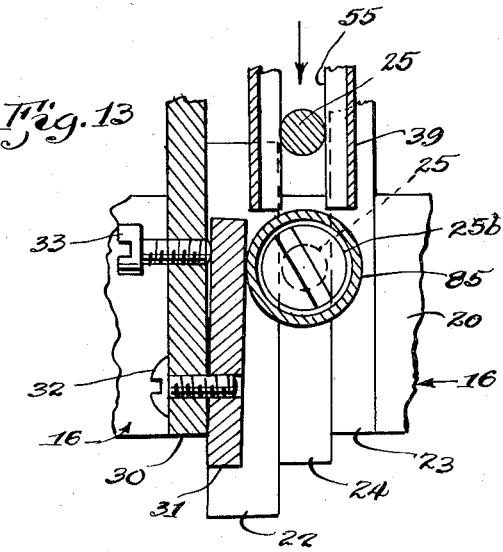

United States Patent Office 2,773,526
Patented Dec. 11, 1956

2,773,526

SCREW DISPENSING AND AFFIXING MECHANISM

Arthur U. Eslick, Luzerne, Mich., assignor, by direct and mesne assignments, to Eslick Associates, Inc., Detroit, Mich., a corporation of Michigan Application May 26, 1955, Serial No. 511,357

9 Claims. (Cl. 144—32)

This invention relates to machine tools and more particularly to a powered screw driver mechanism operable in conjunction with a screw dispensing and affixing mechanism.

Prior self-feeding tools of this type are rather complex in construction and difficult for the average operator to handle. With most of such tools, the feeding mechanism is usually an integral part of the tool itself and generally embodies a chucking means which requires a manually operated clutch device and requires the services of a skilled operator because such tools are of a complex construction.

In the present problem, a screw is being dealt with and screws and similar items are difficult to handle. As a result, the devices now available cannot be operated with any degree of speed and in general these chucking devices for handling screws and the like can only handle about 500 to 600 screws an hour. There is a crying need for a machine tool which will speed up production.

An object of this invention is to speed up production and facilitate the rapid handling of screws and the application thereof to finished production by constructing a machine tool operable in conjunction with a dispensing and affixing mechanism of simplified structure capable of being operated and used by an unskilled operator.

Another object of the present invention is to provide for more efficient and ready handling of screws and similar fastening devices by providing a dispensing and affixing mechanism cooperating with a powered screw driver in such a manner that the screw is quickly and securely affixed to the power screw driver so that the same may be readily and quickly applied to the work, and it is not unusual for an operator using the machine tool defined in the present invention to apply upwards of 1500 to 1800 screws per hour.

Power screw drivers embodying chucking devices and the like have considerable weight and do impose limitations as regards speed of the driver, and therefore a further object of this invention is to provide a driver of minimum weight and mass so as to minimize such speed limitations, this being accomplished in the present invention by incorporating the general affixing means with the dispensing apparatus constructed and arranged to cooperate with the powered screw driver to securely affix the screw thereto, so that the same can be manually conveyed and applied to the work with a maximum of speed and efficiency.

A further object of the invention is to avoid damage to equipment by so constructing the components of the dispensing mechanism that the rotating bit of a power driven screw driver cannot become jammed or otherwise engaged therein in case of malfunction.

A further object of the invention is to enable assembly, fabrication, or construction requiring use of a plurality of screw types or sizes, by providing easily replaceable screw driver bits and a screw dispensing mechanism equipped with a minimum of required adjustments and easily replaceable screw retaining fixture blocks of varying sizes.

For a more detailed understanding of this invention and of further objects thereof, reference may be had to the accompanying drawings illustrating a preferred embodiment of the invention in which like characters refer to like parts throughout the several views, and in which Fig. 1 is a plan view of the dispenser mechanism and the associated power driven screwdriver partly in section and including such other electrical components as are embodied in the assembly.

Fig. 2 is a side elevational view of the dispenser mechanism with the power driven screwdriver in substantially a vertical position at the screw pickup location.

Fig. 3 is a longitudinal cross sectional view of the conveying portion of the dispensing mechanism with the screwdriver bit assembly in position for screw engagement.

Fig. 10 is a cross sectional fragmentary view taken on line 10—10 of Fig. 3 and showing a screw supported within the feeder tube of the dispensing mechanism.

Fig. 11 is an elevational cross sectional view of the power screwdriver mechanism embodied in the invention.

Fig. 12 is a cross sectional view taken substantially on the line 12—12 of Fig. 4, and Fig. 13 is a cross sectional view taken substantially on the line 13—13 of Fig. 4.

Figure 4:
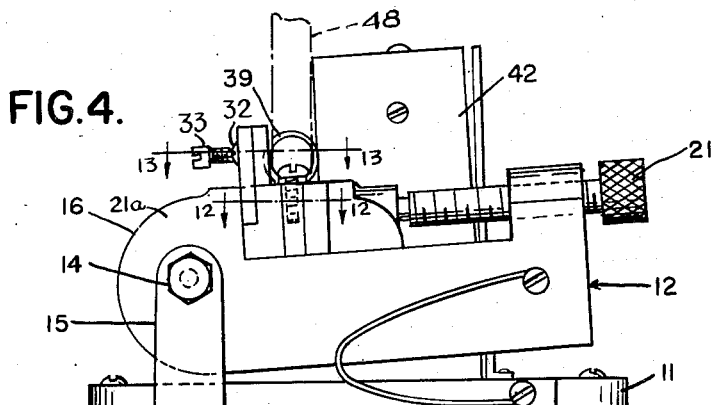
Fig. 4 is an end view in elevation of the dispensing mechanism showing the pivotally mounted retaining fixture raised off the support.
Figure 5:
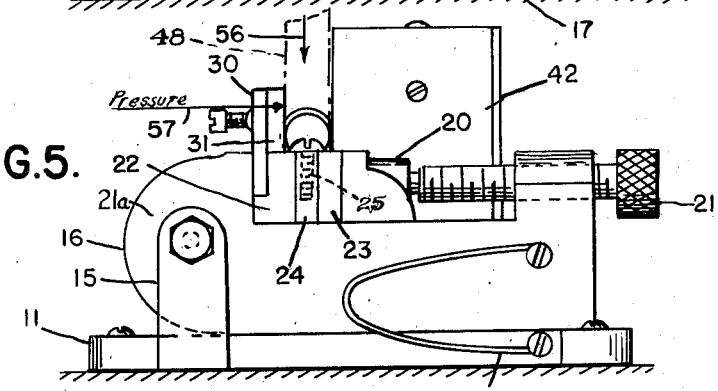
Fig. 5 is a similar end view showing the retaining fixture forced to lowered position by downward action of the powered screwdriver.

Referring in more detail to the drawings, this invention comprises a support 11 adapted to be suitably mounted to a board, table, or the like, on which the screw delivery and retaining fixture 12 is pivotally carried as at 13 by a bolt 14 extending through the upright mounting arms 15 of the support 11 and the fixture body 16. A spring 17 as shown in Figs. 4 and 5, secured to the support 11 and the fixture body 16 acts to yieldingly lift or raise the screw delivery and retaining fixture 12 off the support 11 as indicated in Fig. 4.

Figure 9:
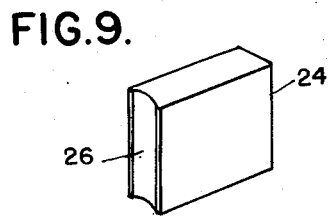
Fig. 9 is a perspective view of the replaceable holding block with which the screw makes contact at the retaining fixture.

The fixture body 16 is essentially a vise, with a sliding block 20 adjustable by means of a tightening screw 21 or other suitable means. Secured to the stationary section 21a of the fixture body 16 is a face plate 22, and secured to the sliding block 20 is another face plate 23. Clamped between the face plates 22 and 23 is a retaining block 24 shown in detail in Fig. 9. The thickness of the retaining block 24 is slightly greater than the shank diameter of the screw 25, and the concave recess 26 in the end face of the block 24 is adapted to approximately fit the shank of the screw 25.

Secured to the fixture body 16 is a plate 30, with an abutment plate 31 fastened to said plate 30 by any suitable fastening means such as a screw 32. Another screw 33 is inserted through a threaded hole in plate 30 so that its end bears against the abutting plate 31. By turning screw 33, the free end of abutment plate 31 can be forced inwardly toward the screw 25.

Figure 1:
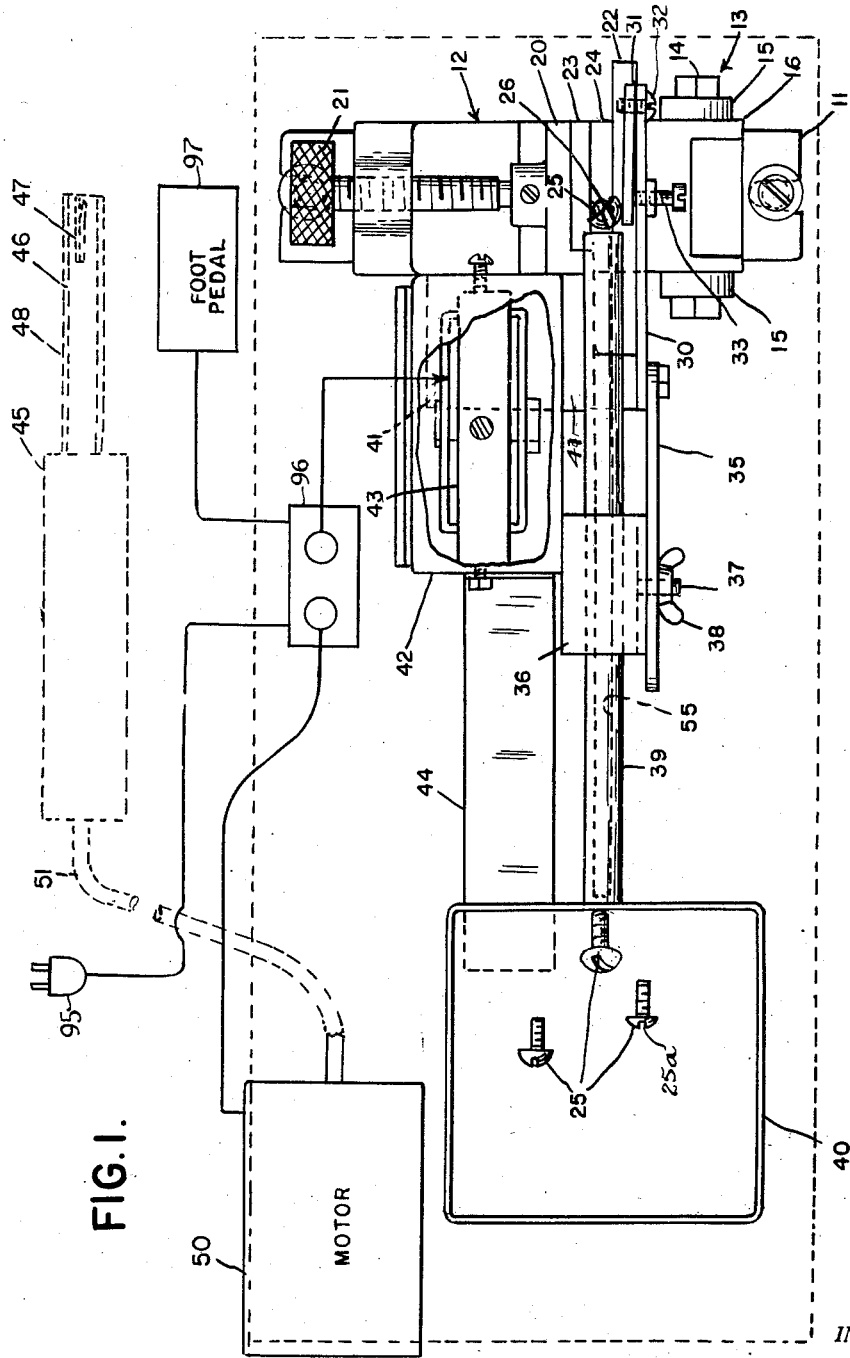

Also secured to plate 30 is a longitudinally slotted plate 35 as shown in Figs. 1 and 2 on which a fitting 36 is adjustably mounted by means of a bolt 37 and wing nut 38 or other suitable fastening device. Secured to and supported by fitting 36 is a feeder tube 39, which opens into and is suitably secured to a hopper 40.

An extension 41 of the fixture body 16 is secured to and supports a casing 42 in which a conventional electrically energized vibrator 43 is suitably mounted. A spring strip 44 is secured to the casing 42 and extends outwardly, serving to support hopper 40 and also to agitate both tube 39 and hopper 40 when current is supplied to the vibrator 43.

The power driven screw driver 45, used in conjunction and cooperation with the screw delivery mechanism and retaining fixture 12, is a powered adaptation of the hand tool patent No. 2,574,026, issued Nov. 6, 1951, entitled "Screw Holding Screw Driver." The power driven screwdriver 45 as embodied in this invention is illustrated in detail in Fig. 11 as comprising a handle assembly 45a, a shaft assembly 46 having a two part bit mechanism 47 therein, and a retractible screw centering tube assembly 48. The power driven screwdriver 45, more particularly the shaft assembly 46, is adapted preferably to be powered from an electric motor 50 shown in Fig. 1 through a flexible drive shaft 51.

The handle assembly 45a comprises a housing 60 and a chuck member 61 rotatably supported in the housing 60 by bearings 61. A square hole 62 in the upper end of the chuck member 61 receives the squared end of a flexible rotating drive wire 51a which is the rotating driving element of the flexible drive shaft 51. The lower end of the chuck member 61 preferably has a hexagonal hole 63 into which a hexagonal shank portion 64 of the shaft assembly 46 is locked in the chuck member 61 preferably by means of a ball snap lock 65.

The shaft assembly 46 has a central longitudinal bore 66 in which the bit mechanism 47 is held. The bit mechanism 47 comprises a bit holding member 70 having an undercut annular recess 71. A locking pin 72 keyed into the shaft assembly 46 locks into the recess 71 to retain the member 70 in the bore 66 and against the pressure of a spring 73. The bit holding member 70 has a longitudinal bore 74. Bit parts 47a and 47b are retained in the bore 74 by a locking pin 75 extending transversely of the bore 74 and through a slot 76 in the longer bit part 47a and a hole 76a in the shorter bit part 47b. A plug element 77 has a slot 78 in which the inner ends of the bit parts 47a and 47b are retained, the bit parts being urged outwardly of the bore 74 by the pressure of a spring 80 seated against an annular shoulder 81 of the plug element 77.

It should be noted that the shorter bit part 47b is held by the pin 75 through the hole 76a in relatively fixed relation to the bit holding member 70, while the longer bit part 47a may be forced inwardly against the pressure of the spring 80 to the extent that the slot 76 permits.

The screw centering tube assembly 48 comprises a sleeve portion 85 having an inner retaining shoulder 86 and an upper female threaded end 87, and a retaining nut 88 adapted to be screwed into the threaded end 87. The shaft assembly 46 is provided with an outer annular shoulder 89, and the retaining nut is screwed into the end 87 onto a washer 90 seated against the shoulder 89. This retains the shaft assembly 46 within the tube assembly sleeve portion 85. A spring 85a within the sleeve portion 85 is seated on the retaining shoulder 86 and exerts pressure against the inner side of the shaft assembly shoulder 89.

Referring to Fig. 1, electrical power is preferably transmitted by a power plug 95 to a junction box 96 and then to the motor 50 and the vibrator 43 upon operation of a foot pedal 97. The motor 50 operates the power driven screw driver 45 through the flexible shaft 51.

In operation, the agitation transmitted to the hopper 40 from the vibrator 43 and casing 42 serves to prevent the jamming of screw 25 at the opening into the tube 39, which is suitably inclined to permit the screw 25 to gravitate down the tube 39, toward the retaining fixture block 24 as illustrated in Fig. 3. The screws having entered the tube, the threaded shanks will drop into the slot 55 running the length of the tube 39, and the heads will be carried uppermost, the screws therefore being delivered singly to the retaining fixture block 24, as illustrated in Figs. 3 and 10.

Fig. 12 illustrates how the shank of the screw 25 is supported or retained on three sides by the face plates 22 and 23 and the recess of the retaining block 24, after the screw exits from the end of the delivery tube 39.

The power driven screw driver 45 is moved into a substantially vertical position over the head 25b of the screw 25 and lowered thereon.

Figures 6, 7, 8:
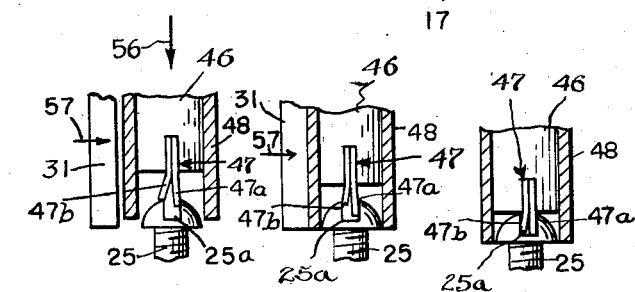
Figs. 6, 7 and 8 are fragmentary diagrammatic views, showing the driver in side elevation, and illustrating successive positions of engagement between the screwdriver bits and the kerf of a screw.

The sleeve 85 of the tube assembly 48 abuts against the end of the delivery tube 39 and the abutment plate 31, as shown in Fig. 13. The abutment plate 31 and the tube 39 both being adjustable as described heretofore, the position of the sleeve 85 may be properly determined in accordance with the size of the screw head 25b whereby to center the screwhead in the sleeve as illustrated. As downward pressure is applied to the screwdriver 45, the tube assembly 48 may retract against the spring 85a so that the end of the sleeve 85 is moved to the approximate position of the dotted line 100 shown in Fig. 11, enabling the rotating bits 47a and 47b to engage with the kerf 25a of the screw 25, as illustrated in Figs. 6, 7 and 8. As seen in Fig. 6, the longer bit part 47a will initially engage in the kerf 25a of the screw 25, causing the screw to begin rotating with the bit. As downward pressure indicated by arrow 56 in Fig. 5 is applied, spring 17 compresses, permitting the screw delivery and retaining fixture 12 to pivot downwardly and causing the abutment plate 31 to exert a side pressure as indicated by arrow 57 against the tube assembly 48 of the screwdriver 45. This side pressure is sufficient to collapse the bit parts 47a and 47b together so that they will both slip into the kerf 25a of the screw (see Fig. 7) and by outward spring tension will be securely held therein.

It should be noted that the means described above for applying side pressure 57 to the tube assembly 48 for the purpose of collapsing the bit parts of the two part bit mechanism 47 is only one of many means which may be employed. Moreover, the screw centering tube assembly 48 may be eliminated and the side pressure 57 then applied to the shaft assembly 46 instead. Also, side pressure could be applied to the screw 25 itself rather than to the tube assembly 48, by any suitable means. Any means may be embodied in the invention as long as it will be such as to provide adequate side pressure for the purpose heretofore stated, without departing from the spirit of the invention.

The tube assembly 48 when utilized, will tend to keep the screw 25 centered on the bit assembly 47 thereafter, as the screwdriver with the screw engaged and affixed thereto is removed from the fixture and the rotating screw then applied to the work.

The present invention is so constructed as to be adapted to almost any size or type of screw. Varying sizes of two part bit mechanism 47 may be utilized, varying diameter feeder tubes 39 may be installed, and the vise arrangement of the retaining fixture described above permits the installation of the required sizes of retaining blocks 24, this assembly permitting the free rotation of the screw when affixed to the driver, due to the block 24 being wider than the shank diameter of the screw.

In addition, a safety feature is incorporated by use of the various adjusting means described. The operator, prior to starting work, will adjust the abutment plate 31 by whichever means may be incorporated so that it almost contacts the head of the screw 25 as delivered against the retaining block, and will also suitably adjust the tube 39 so that the end of tube 39 will also almost contact the screw head. Thus the space into which the screw is delivered is sufficiently small to prevent the rotating two part bit mechanism 47 from becoming engaged between the face plates 22 and 23 and being subsequently damaged if the screw is not properly delivered.

It will be apparent to those skilled in the art to which this invention pertains that various changes and modifications may be made therein, without departing from the spirit of the invention or from the scope of the appended claims.

I claim:

1. A screw dispenser for conveying and affixing a screw to a power driven screw driver and comprising a support, a screw delivery and retainer fixture pivotally carried by said support, spring means yieldingly raising the fixture off said support, said power driven screw driver having a shaft, a bit assembly freely slidable and non-rotatably supported within the shaft, means operating in all positions of the bit for resiliently urging said bit outwardly, said bit assembly comprising a pair of resilient strips constructed to spring apart but to be compressed together by a lateral force for final engagement with the kerf of said screw, said fixture having an abutment operable to apply a lateral force on said screw driver when engaged with said screw in said fixture and when downward pressure is exerted on said fixture by said screw driver to lower said fixture, said lateral force as exerted by said abutment being operable to lock the bits within the kerf of said screw, whereby said power screw driver may be selectively moved to apply the screw to a work piece.

2. A screw dispenser for conveying and affixing a screw to a power driven screw driver of the type comprising a tubular shaft, a bit assembly yieldingly mounted therein and projecting therefrom, said bit assembly comprising a pair of resilient bits relatively longitudinally movable with respect to each other and in contact for at least a part of their length, and sprung apart at their free ends, means yieldingly maintaining one of said bits in such position that its free end projects slightly beyond that of the other, said dispenser having a fixture for supporting said screw with the head thereof facing upwardly, and means actuated on forcing said power driven screw driver against the head of the screw and initially engaging one of said bits and acting to exert a side thrust to collapse said sprung apart bits and provide for locking assembly of both bits into the kerf of said screw to securely lock the screw to the power driven screw driver, whereby said screw driver may be retracted from said fixture and remove the screw therefrom.

3. A screw dispenser for conveying and affixing a screw to a power driven screw driver of the type comprising a tubular shaft, a bit assembly yieldingly mounted therein and projecting therefrom, said bit assembly comprising a pair of resilient bits relatively longitudinally movable with respect to each other and in contact for at least a part of their length and sprung apart at their free ends, means yieldingly maintaining one of said bits in such position that its free end projects slightly beyond that of the other, said dispenser having a fixture for supporting said screw with the head thereof facing upwardly, and means operable to force both said bits into the kerf of the screw when said rotating power driven screw driver is forced down onto said screw.

4. A screw dispenser for conveying and affixing a screw to a power driven screw driver of the type comprising a tubular shaft, a bit assembly yieldingly mounted therein and projecting therefrom, said bit assembly consisting of a pair of resilient bits relatively longitudinally movable with respect to each other and in contact for at least a part of their length, and sprung apart at their free ends, means yieldingly maintaining one of said bits in such position that its free end projects slightly beyond that of the other, said dispenser having a fixture for supporting said screw with the head thereof facing upwardly, and means operable to force both said bits into the kerf of the screw when said rotating power driven screw driver is forced down onto said screw, said means comprising an abutment actuated to apply a lateral force against the shaft, whereby to bring said bits into close contact for fitting both said bits into the kerf of said screw.

5. A screw dispenser for conveying and affixing a screw to a power driven screw driver of the type comprising a tubular shank, a bit assembly yieldingly mounted therein and projecting therefrom, said bit assembly consisting of a pair of resilient bits relatively longitudinally movable with respect to each other and in contact for at least a part of their length, and sprung apart at their free ends, means yieldingly maintaining one of said bits in such position that its free end projects slightly beyond that of the other, said dispenser having a fixture for supporting said screw head up, and means operable to force both said bits into the kerf of the screw when said rotating power driven screw driver is forced down onto said screw, said means comprising an abutment carried by said fixture and actuated to apply a lateral force against the shank whereby to bring said bits into close contact for fitting both said bits into the kerf of said screw, said fixture being resiliently pivotally mounted and thereby rocked on pushing the rotating screw driver onto said screw to thereby cause the abutment to exert such lateral force.

6. A screw dispenser for conveying and affixing a screw to a power driven screw driver of the type comprising a tubular shaft, a bit assembly yieldingly mounted therein and projecting therefrom, said bit assembly comprising a pair of resilient bits relatively longitudinally movable with respect to each other and in contact for at least a part of their length and sprung apart at their free ends, means yieldingly maintaining one of said bits in such position that its free end projects slightly beyond that of the other, said dispenser having a fixture for supporting said screw with the head thereof facing upwardly, and means operable to force both said bits into the kerf of the screw when said rotating power driven screw driver is forced down onto said screw, and a sleeve resiliently supported on said shaft and operable to fit over the head of the screw to align the bits with said screw.

7. A screw dispenser for conveying and affixing a screw to a power driven screw driver and comprising a support, a screw delivery and retainer fixture pivotally carried by said support, spring means yieldingly raising the fixture off said support, said power driven screw driver having a shaft, a bit assembly freely slidable and non-rotatably supported within the shaft, means operating in all positions of the bit for resiliently urging said bit outwardly, said bit assembly comprising a pair of resilient strips constructed to spring apart but to be compressed together by a lateral force for final engagement with the kerf of said screw, said fixture having an abutment operable to apply a lateral force on said screw driver when engaged with said screw in said fixture and when downward pressure is exerted on said fixture by said screw driver to lower said fixture, said lateral force as exerted by said abutment being operable to lock the bits within the kerf of said screw, whereby said power screw driver may be selectively moved to apply the screw to a work piece, said fixture having a stop plate secured thereto provided with a recessed end to receive the shank of the screw, said stop plate serving to stop the bit assembly from entering the screw receiving recess in the absence of a screw disposed therein.

8. A screw dispenser for conveying and affixing a screw to a power driven screw driver and comprising a support, a screw delivery and retainer fixture pivotally carried by said support, spring means yieldingly raising the fixture off said support, said power driven screw driver having a shaft, a bit assembly freely slidable and non-rotatably supported within the shaft, means operating in all positions of the bit for resiliently urging said bit outwardly, said bit assembly comprising a pair of resilient strips constructed to spring apart but to be compressed together by a lateral force for final engagement with the kerf of said screw, said fixture having an abutment operable to apply a lateral force on said screw driver when engaged with said screw in said fixture and when downward pressure is exerted on said fixture by said screw driver to lower said fixture, said fixture having a stop plate secured thereto and provided with a recessed end to receive the shank of the screw, said stop plate serving to stop the bit assembly from entering the screw receiving recess in the absence of a screw disposed therein, said fixture comprising a vise structure having a fixed part and a movable part, and means for adjusting the movable part of said vise structure, said stop plate being clamped between said vise parts, said abutment being adjustably carried on said fixed vise part.

9. A screw dispenser for conveying and affixing a screw to a power driven screw driver comprising a support, a screw delivery and retainer fixture yieldingly carried by said support and an abutment supported for relative lateral movement with respect to said screw driver, said screw driver comprising a shaft, a bit assembly freely slidable and non-rotatably supported within said shaft, and means operable in all positions of the bit for resiliently urging said bit outwardly of said shaft, said bit assembly comprising a pair of resilient strips constructed to spring apart but to be compressed together by a lateral force for final engagement with the kerf of said screw, said abutment being relatively moved with respect to said screw driver on forcing the power driven screw driver downwardly on said fixture to apply the lateral force aforesaid to said screw driver, whereby to collapse said spread apart bits and to lock the screw to said driver.

References Cited in the file of this patent

UNITED STATES PATENTS

| | | |
|---|---|---|
| 1,915,546 | Muller | June 27, 1933 |
| 1,949,763 | Schenk | Mar. 6, 1934 |
| 2,574,026 | Eslick | Nov. 6, 1951 |
| 2,575,473 | Selseth | Nov. 20, 1951 |

FOREIGN PATENTS

| | | |
|---|---|---|
| 74,011 | Norway | Sept. 20, 1948 |